(12) United States Patent
Srinivasan et al.

(10) Patent No.: US 11,287,947 B2
(45) Date of Patent: Mar. 29, 2022

(54) CONTEXTUAL INPUT IN A THREE-DIMENSIONAL ENVIRONMENT

(71) Applicant: Microsoft Technology Licensing, LLC, Redmond, WA (US)

(72) Inventors: Vidya Srinivasan, Issaquah, WA (US); Andrew John Howe, Sammamish, WA (US); Michael Lee Smith, Kirkland, WA (US); Harold Anthony Martinez Molina, Seattle, WA (US); Nathan Bradley Duke, Kirkland, WA (US); Amy Scarfone, Seattle, WA (US); Purnima Rao, Bellevue, WA (US); Colton Brett Marshall, Redmond, WA (US); Aniket Handa, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/413,528

(22) Filed: May 15, 2019

(65) Prior Publication Data

US 2020/0363930 A1 Nov. 19, 2020

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/011* (2013.01); *G06F 3/04842* (2013.01);
(Continued)

(58) Field of Classification Search
CPC .. G06F 3/04815; G06F 3/011; G06F 3/04842; G06F 3/017; G06F 3/0481;
(Continued)

(56) References Cited

U.S. PATENT DOCUMENTS 10,181,218 B1  1/2019 Goetzinger et al.
10,339,721 B1  7/2019 Dascola et al.
(Continued)

FOREIGN PATENT DOCUMENTS

EP    2469474 A1    6/2012
WO    2019046597 A1    3/2019

OTHER PUBLICATIONS

"SharePoint Spaces", Retrieved From: https://web.archive.org/web/20190401134501/https://www.exploresharepointspaces.com/, Apr. 1, 2019, 9 Pages.

(Continued)

*Primary Examiner* — Patrick N Edouard
*Assistant Examiner* — Douglas M Wilson
(74) *Attorney, Agent, or Firm* — Newport IP, LLC; Leonard J. Hope

(57) ABSTRACT

Aspects of the present disclosure relate to contextual input in a three-dimensional (3D) environment. In an example, a 3D environment is authored using an authoring application, wherein the author selects and positions one or more content items within the 3D environment. The 3D environment has a set of possible environment events that are associated with user input events. As a result, an environment event is generated when a user input event is received from an input device. An author uses the authoring application to associate an environment event with an action of the content item. A user is able to use a variety of input devices to interact with the 3D environment. When an input event is received from an input device, an environment event is generated accordingly, and a content item action associated with the environment event is performed in response to the environment event.

17 Claims, 13 Drawing Sheets

US 11,287,947 B2
Page 2

(51) Int. Cl.
*G06F 3/0484* (2013.01)
*G06F 3/0482* (2013.01)
*G06T 19/00* (2011.01)
*G06F 3/04815* (2022.01)
*G06F 3/04842* (2022.01)
*A63F 13/20* (2014.01)
*G06T 17/00* (2006.01)

(52) U.S. Cl.
CPC ....... *A63F 13/20* (2014.09); *A63F 2300/8082* (2013.01); *G06F 3/017* (2013.01); *G06F 3/0481* (2013.01); *G06F 3/0482* (2013.01); *G06F 3/0484* (2013.01); *G06T 17/00* (2013.01); *G06T 19/003* (2013.01); *G06T 2207/20092* (2013.01); *G06T 2207/20101* (2013.01); *G06T 2207/20104* (2013.01); *G06T 2210/12* (2013.01); *G06T 2219/024* (2013.01); *G06T 2219/2004* (2013.01); *G06T 2219/2016* (2013.01)

(58) Field of Classification Search
CPC ...... G06F 3/0482; G06F 3/0484; A63F 13/20; A63F 2300/8082; G06T 17/00; G06T 19/003; G06T 2207/20092; G06T 2207/20101; G06T 2207/20104; G06T 2210/12; G06T 2219/024; G06T 2219/2004; G06T 2219/2016
See application file for complete search history.

(56) References Cited

U.S. PATENT DOCUMENTS

| | | |
|---|---|---|
| 2001/0044858 A1 | 11/2001 | Rekimoto |
| 2002/0018061 A1 | 2/2002 | Gantt |
| 2007/0120846 A1 | 5/2007 | Ok et al. |
| 2009/0055735 A1 | 2/2009 | Zaleski et al. |
| 2010/0095248 A1 | 4/2010 | Karstens |
| 2010/0321391 A1 | 12/2010 | Beckman et al. |
| 2011/0249073 A1 | 10/2011 | Cranfill et al. |
| 2011/0279445 A1 | 11/2011 | Murphy et al. |
| 2012/0075343 A1 | 3/2012 | Chen et al. |
| 2012/0229449 A1 | 9/2012 | Psistakis et al. |
| 2013/0090101 A1 | 4/2013 | Park et al. |
| 2013/0187912 A1 | 7/2013 | Mueller |
| 2013/0235234 A1 | 9/2013 | Cucci et al. |
| 2013/0328871 A1 | 12/2013 | Piemonte et al. |
| 2013/0328925 A1 | 12/2013 | Latta et al. |
| 2013/0335405 A1 | 12/2013 | Scavezze et al. |
| 2014/0058959 A1 | 2/2014 | Isbjornssund et al. |
| 2014/0143691 A1 | 5/2014 | Huang |
| 2014/0176542 A1 | 6/2014 | Shohara et al. |
| 2014/0267279 A1 | 9/2014 | Kontkanen |
| 2014/0285619 A1 | 9/2014 | Acquavella et al. |
| 2014/0340396 A1* | 11/2014 | Jeon ........................ G06T 17/00 345/420 |
| 2015/0049086 A1 | 2/2015 | Morato et al. |
| 2015/0052479 A1 | 2/2015 | Ooi et al. |
| 2015/0091906 A1 | 4/2015 | Dishno |
| 2015/0249815 A1 | 9/2015 | Sandrew et al. |
| 2015/0254905 A1 | 9/2015 | Ramsby et al. |
| 2015/0309705 A1 | 10/2015 | Keeler et al. |
| 2015/0350634 A1 | 12/2015 | Lim et al. |
| 2015/0358613 A1 | 12/2015 | Sandrew et al. |
| 2016/0019720 A1 | 1/2016 | Thurber et al. |
| 2016/0078679 A1* | 3/2016 | Maximo .................. G06T 3/00 345/633 |
| 2016/0210788 A1 | 7/2016 | Kasahara |
| 2016/0275209 A1 | 9/2016 | Kelly et al. |
| 2016/0358374 A1 | 12/2016 | Ju et al. |
| 2017/0069143 A1 | 3/2017 | Salter et al. |
| 2017/0076429 A1 | 3/2017 | Russell |
| 2017/0169616 A1* | 6/2017 | Wiley ................. G06F 3/04842 |
| 2017/0372457 A1 | 12/2017 | Sylvan et al. |
| 2018/0113596 A1 | 4/2018 | Ptak et al. |
| 2018/0190003 A1* | 7/2018 | Upadhyay .......... G06F 3/04815 |
| 2018/0268582 A1 | 9/2018 | Schneider et al. |
| 2018/0286139 A1 | 10/2018 | Moncayo |
| 2018/0308274 A1 | 10/2018 | Molina et al. |
| 2018/0308289 A1 | 10/2018 | Srinivasan et al. |
| 2018/0314405 A1 | 11/2018 | Le Doux et al. |
| 2019/0065027 A1 | 2/2019 | Hauenstein et al. |
| 2019/0111347 A1 | 4/2019 | Rimon |
| 2019/0246238 A1 | 8/2019 | Crutchfield et al. |
| 2019/0251076 A1 | 8/2019 | Yan |
| 2019/0340829 A1 | 11/2019 | Marshall et al. |
| 2019/0385371 A1* | 12/2019 | Joyce .................... G06T 19/006 |
| 2020/0082627 A1 | 3/2020 | Palos et al. |
| 2020/0111195 A1 | 4/2020 | Vlachos et al. |
| 2020/0363929 A1 | 11/2020 | Srinivasan et al. |
| 2020/0364941 A1 | 11/2020 | Srinivasan et al. |
| 2020/0364942 A1 | 11/2020 | Srinivasan et al. |
| 2020/0364943 A1 | 11/2020 | Srinivasan et al. |
| 2020/0366832 A1 | 11/2020 | Srinivasan et al. |

OTHER PUBLICATIONS

"Notice of Allowance Issued in U.S. Appl. No. 16/413,455", dated Nov. 27, 2020, 11 Pages.

"International Search Report and Written Opinion Issued in PCT Application No. PCT/US20/028378", dated Jul. 24, 2020, 9 Pages.

"International Search Report and Written Opinion issued in PCT Application No. PCT/US20/028025", dated Sep. 3, 2020, 17 Pages.

"International Search Report and Written Opinion issued in PCT Application No. PCT/US20/028380", dated Sep. 7, 2020, 19 Pages.

"Non Final Office Action Issued in U.S. Appl. No. 16/413,542", dated Jul. 13, 2020, 25 Pages.

"Notice of Allowance Issued in U.S. Appl. No. 16/413,478", dated Jul. 16, 2020, 9 Pages.

"Non Final Office Action Issued in U.S. Appl. No. 16/413,485", dated Jun. 29, 2020, 28 Pages.

"Non Final Office Action Issued in U.S. Appl. No. 16/413,519", dated Jul. 29, 2020, 11 Pages.

"Final Office Action Issued in U.S. Appl. No. 16/413,519", dated Dec. 9, 2020, 13 Pages.

"International Search Report and Written Opinion Issued in PCT Application No. PCT/US20/028382", dated Jul. 16, 2020, 11 Pages.

"International Search Report and Written Opinion Issued in PCT Application No. PCT/US20/028384", dated Jul. 30, 2020, 11 Pages.

"International Search Report and Written Opinion Issued in PCT Application No. PCT/US20/028026", dated Jul. 14, 2020, 11 Pages.

"Final Office Action Issued in U.S. Appl. No. 16/413,542", dated Nov. 2, 2020, 30 Pages.

"Non-Final Office Action Issued in U.S. Appl. No. 16/413,542", dated Mar. 24, 2021, 34 Pages.

"Notice of Allowance Issued in U.S. Appl. No. 16/413,478", dated Jan. 12, 2021, 9 Pages.

"Final Office Action Issued In U.S. Appl. No. 16/413,485", dated Jan. 8, 2021, 40 Pages.

"Applicant Initiated Interview Summary issued in U.S. Appl. No. 16/413,542", dated Jun. 15, 2021, 2 Pages.

* cited by examiner

CONTEXTUAL INPUT IN A THREE-DIMENSIONAL ENVIRONMENT

BACKGROUND

A variety of input devices may be used to interact with content in a three-dimensional (3D) environment. As a result, it is difficult to develop a 3D environment that processes the array of potential inputs that may be received from users. These difficulties are further compounded in examples where authoring software is provided for an author to design a 3D environment, as such considerations introduce additional (and likely unnecessary) complexity into the authoring process.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to contextual input in a three-dimensional (3D) environment. In an example, a 3D environment is authored using an authoring application, wherein the author selects and positions one or more content items within the 3D environment. The 3D environment has a set of possible environment events that are associated with user input events and used to trigger actions for content items in the 3D environment. An author uses the authoring application to associate a given environment event with a content item action. Thus, an environment event is generated when a user input event is received from an input device, thereby causing the content item action to occur.

Accordingly, a user is able to use a variety of input devices to interact with the 3D environment regardless of the type of input events that are generated by such input devices. When an input event is received from an input device, an associated environment event is generated. A content item is determined in order to provide the generated environment event to the content item with which the user is interacting. The environment event is provided to the content item, thereby causing the content item action to be performed.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
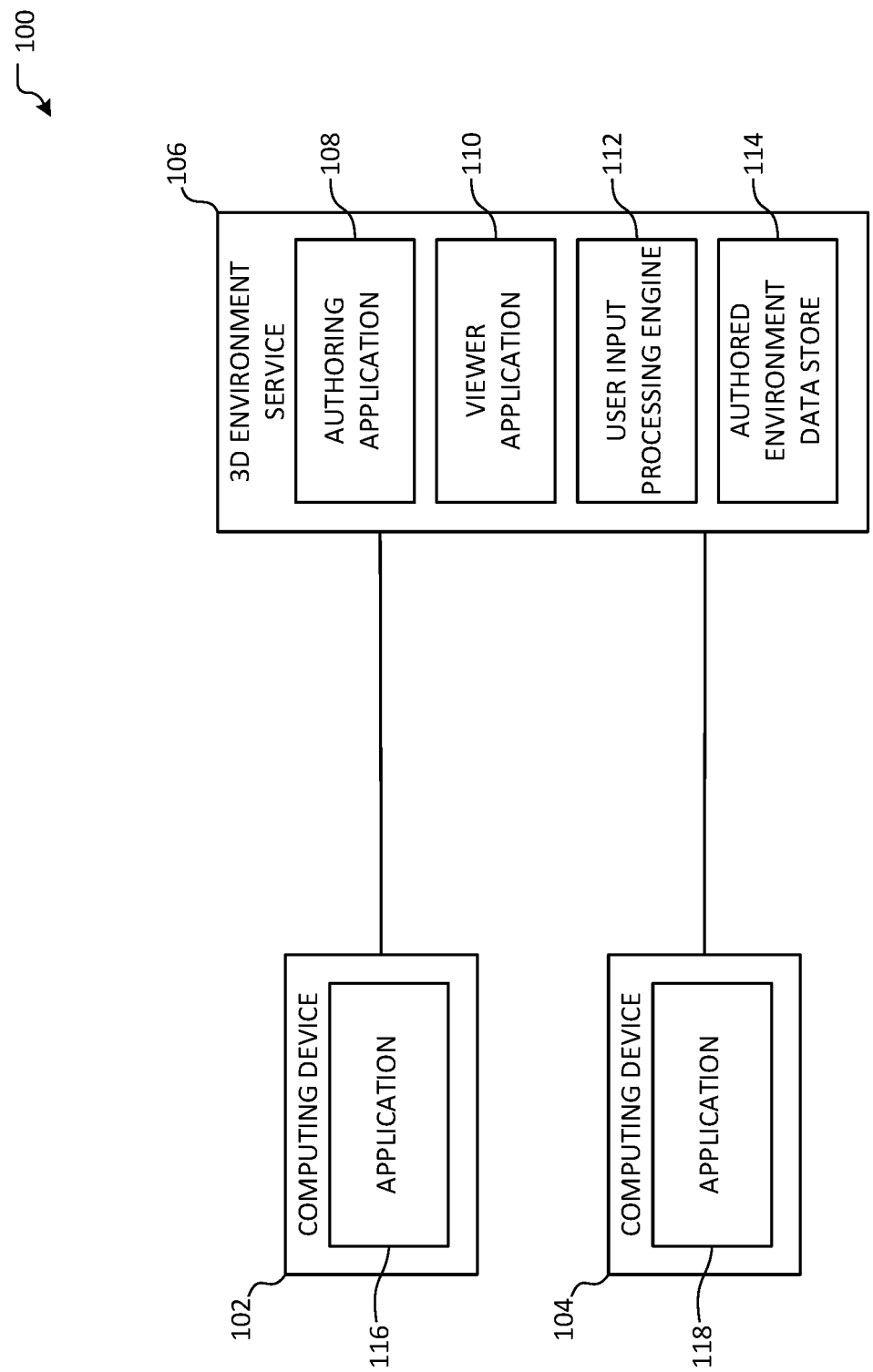
FIG. 1 illustrates an overview of an example system for contextual input in a three-dimensional environment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In an example, an author uses an authoring application to author a three-dimensional (3D) environment. The authoring application enables the author to add content to the 3D environment and position the content therein. An end user may use a viewer application to consume the 3D environment and interact with the content accordingly. However, a wide variety of possible input devices may be used, including, but not limited to, a mouse, a keyboard, a touchscreen, a game controller, or a physical gesture recognition device, among other examples. As a result, accounting for a wide array of potential input events is difficult. Additionally, different content within the 3D environment may process input events differently to perform one or more actions. Correctly linking various input events to such actions is a complex task and may introduce unnecessary complexity for an author of the 3D environment.

Accordingly, aspects of the present disclosure relate to contextual input in a 3D environment. In examples, a 3D environment has a set of possible environment events, such as a primary event and a secondary event, among other events. One or more input events (e.g., as may be received by an input device) are associated with an environment event. As a result, when an input event is received by an input device, an associated environment event is determined. A content item has an associated action, which can be linked to the environment event in order to cause the associated action to be performed by the content item when the environment event is triggered. Thus, according to aspects disclosed herein, an authoring application is used to add content item to a 3D environment and link environment events to content item actions accordingly. When a user interacts with the 3D environment, an input event from an input device is processed to generate an environment event, which is provided to an associated content item accordingly, thereby causing the content item to perform the action associated with the environment event.

As used herein, an authoring application is used by an author to create or edit a 3D environment. The authoring application may be a native application, a web application, or any combination thereof, among other examples. In some examples, different types of content may be embedded or included in the 3D environment as content items. Example content includes, but is not limited to, 3D objects (e.g., 3D models, figures, shapes, etc.), 2D objects (e.g., files, images, presentations, documents, web sites, videos, remote resources, etc.), or audio content, among other content. In addition to content items added to the 3D environment, one or more assets may be used. For example, a 3D environment may comprise a structure in which content is placed, assets for a background of the 3D environment, sound assets, or animation assets, among other assets. Thus, an asset may be a 3D model, a texture, an image, an animation, or a sound, among other assets used to implement or generate aspects of a 3D environment.

A 3D environment has a set of environment events. As used herein, an environment event is a predefined event of a 3D environment, which is associated with one or more input events from one or more input devices. Thus, the set of environment events provides a level of abstraction from specific (e.g., device-specific, manufacturer-specific, etc.) input events that are generated by various input devices. Thus, environment events can be used to specify actions that should be performed in the 3D environment. Example environment events include, but are not limited to, a primary event, a secondary event, a next event, and/or a back event. Input events are associated with environment events. For example, a left click or trigger press may be associated with a primary environment event, a right click or an inspect button may be associated with a secondary environment event, a right arrow or right swipe may be associated with a next environment event, while a left arrow or left swipe may be associated with a back environment event. An authoring application may enumerate a list of available environment events, such that an author is able to associate an environment event with an action of a content item. As a result, the author need not consider which of a variety of input devices may be used to interact with the 3D environment. Similarly, an end user is able to use a wide array of input devices when consuming the 3D environment. In some examples, a content item triggers another content item. For example, the first content item may provide an indication causing an environment event to be generated and provided to the second content item. As used herein, an "author" and an "end user" are each a type of user of a computing device. It will be appreciated that tasks described with respect to an author may, in other examples, be performed by an end user, and vice versa.

An authored 3D environment is stored as an environment data file. The environment data file comprises information relating to content items, environment event and action associations, and assets for inclusion in the 3D environment. In examples, a viewer application generates a 3D environment based on an environment data file for consumption by an end user. In examples, a 3D environment may be a virtual space, such as a virtual reality (VR) world, or may be a real world space in which content may be displayed or layered on top of the real world, among other augmented reality (AR) or VR techniques. The viewer application is executed by a computing device, such as a desktop computer or a smartphone. In an example, a 3D environment is experienced using any of a wide variety of VR or AR devices, ranging from low-end devices (e.g., GOOGLE CARDBOARD) to high-end devices (e.g., MICROSOFT HOLOLENS, OCULOUS RIFT, HTC VIVE, etc.).

As discussed above, a computing device may have any of a variety of input devices, including, but not limited to, a mouse, a keyboard, a touchscreen, a game controller, or a physical gesture recognition device, among other examples. Accordingly, input events received from such devices are processed by the viewer application to generate associated environment events, which are provided to content items in the 3D environment accordingly. Thus, device- or platform-specific idiosyncrasies may be handled by the viewer application, thereby making such idiosyncrasies invisible to both the end user and the author of the 3D environment.

FIG. 1 illustrates an overview of an example system 100 for contextual input in a three-dimensional environment. As illustrated, system 100 comprises computing devices 102 and 104, and 3D environment service 106. In an example, computing devices 102 and 104 may be any of a variety of computing devices, including, but not limited to, a mobile computing device, a laptop computing device, a tablet computing device, or a desktop computing device. In some examples, 3D environment service 106 is provided as part of a collaborative, communication, or productivity platform. It will be appreciated that while 3D environment service 106 and elements 108-114 are illustrated as separate from computing devices 102 and/or 104, one or more of elements 108-114 may be provided by computing devices 102 and/or 104 other examples. As an example, computing device 102 may comprise authoring application 108, while computing device 104 may comprise viewer application 110.

System 100 illustrates 3D environment service 106 as comprising authoring application 108, viewer application 110, user input processing engine 112, and authored environment data store 114. Authoring application 108 is used to author a 3D environment according to aspects disclosed herein. In an example, authoring application 108 provides a graphical user interface (GUI) with which a user designs a 3D environment. For example, authoring application 108 enables an author to select content items and position the content items within the 3D environment accordingly. In examples, authoring application 108 presents a list of available environment events, which an author uses to associate one or more actions of a content item with a selected environment event. In some examples, the list of available environment events is filtered based on a content item type. In other examples, the list comprises events generated by one or more content items, such that one content item can trigger another content item. As discussed in greater detail below, an end user may then use viewer application 110 to consume the 3D environment and interact with content items.

3D environment service 106 is illustrated as further comprising user input processing engine 112. In examples, authoring application 108 uses user input processing engine 112 to enumerate available environment events for a 3D environment. For example, user input processing engine 112 may determine a set of available environment events based on a content item type (e.g., a video content item, an image content item, a 3D model content item, etc.). User input processing engine 112 is used by authoring application 108 to process user input events when an author is authoring the 3D environment, thereby enabling the author to interact with content items. Similarly, user input processing engine 112 is used by viewer application 110 to process user input events when an end user is viewing/interacting with the 3D environment. While user input processing engine 112 is illustrated as separate from authoring application 108 and viewer application 110, it will be appreciated that, in other examples, similar aspects are implemented by authoring application 108 and/or viewer application 110.

In examples, processing an input event comprises identifying an association of the input event with an environment event. User input processing engine 112 further determines a content item that receives the environment event. In examples, an association between the environment event and an action of the determined content item is used to determine the action that is performed by the content item. Determining the content item to receive the environment event may comprise determining whether the input event is associated with a bounding box associated with a content item. As used herein, a bounding box is a rectangular prism that encompasses the graphical representation of the content item in the 3D environment. It will be appreciated that other geometry may be used, such as a bounding sphere or a more complex mesh associated with a content item. For example, a cursor may be positioned between the bounding box of a content item and a camera associated with a view of the user into the 3D environment, such that an input event associated with the cursor is determined to be directed to the content item. In another example, a user uses a VR controller to gesture in the direction of a content item, such that it is determined that the content item is the target of the input event. It will be appreciated that other detection techniques may be used according to aspects described herein.

In some instances, multiple bounding boxes are identified, such that a set of potential content items is determined. In examples, one content item is determined from the set based on evaluating a model associated with the content item. For example, a bounding box comprising a graphical representation of the content item at the location of the input event is selected over a bounding box comprising empty space at the location of the input event. In other examples, bounding box size or proximity to the user is evaluated to select one content item from the set of potential content items.

A 3D environment authored using authoring application 108 is stored as an environment data file. The environment data file comprises information relating to content items, environment event and action associations, and assets for inclusion in the 3D environment. For example, the environment data file comprises information relating to one or more content items, such as a location at which to display the content item, as well as a reference to the content. In other examples, the environment data file stores the content itself. It will be appreciated that the information stored by an environment data file described herein is provided as an example. The environment data file may be stored in authored environment data store 114 for consumption by an end user (e.g., using viewer application 110) or for further revision using authoring application 108 (e.g., by the same author, a different author, etc.).

In some examples, authoring application 108 is a web-based application, wherein a computing device of a user (e.g., computing device 102 or computing device 104) may access authoring application 108 using a web browser. In other examples, authoring application 108 may be an executable application, which may be retrieved and executed by a user's computing device.

Viewer application 110 generates a 3D environment based on an environment data file to enable a user to view, explore, and/or interact with the 3D environment and content items located therein. In an example, viewer application 110 is a web-based application, wherein a computing device of a user (e.g., computing device 102 or computing device 104) accesses viewer application 110 using a web browser. In other examples, viewer application 110 may be an executable application, which may be retrieved and executed by a user's computing device. Viewer application 110 may populate the generated 3D environment with content items as specified by the environment data file.

Viewer application 110 uses user input processing engine 112 to process user input from one or more input devices when a user is exploring a 3D environment as described above. For example, input events received by viewer application 110 from one or more input devices are processed to generate associated environment events. A target content item for the user input is determined, such that a generated environment event is provided to the content item in the 3D environment accordingly.

Authored environment data store 114 stores one or more environment data files, as may be authored by authoring application 108. In some examples, an "environment data file" as is used herein is stored as a file on a file system, an entry in a database, or may be stored using any of a variety of other data storage techniques. In examples, the environment data file is stored on a server (e.g., server 802 in FIG. 8). In an example where authoring application 108 is a locally-executed application, at least a part of an authored environment data file may be received from one of computing devices 102 and 104, and stored using authored environment data store 114. In some examples, viewer application 110 retrieves an environment data file from authored environment data store 114, which, in conjunction with one or more content items and/or assets, may be used to generate a 3D environment. In an example where a viewer application is a locally-executed application, aspects of one or more asset containers may be stored local and/or remote to the device executing the application, and at least a part of an environment data file may be retrieved from authored environment data store 114. In some examples, the environment data file may be streamed or retrieved in chunks, so as to reduce bandwidth consumption and/or to improve responsiveness. It will be appreciated that other data storage and/or retrieval techniques may be used without departing from the spirit of this disclosure.

Applications 116 and 118 of computing devices 102 and 104, respectively, may be any of a variety of applications. In an example, application 116 and/or 118 is an authoring application as described above, wherein a user of computing device 102 and/or 104 may use the application to author a 3D environment described by an environment data file. In some examples, the environment data file is stored by authored environment data store 114. In another example, application 116 and/or 118 is a viewer application as described above, which may be used to view, render, and/or explore a 3D environment defined at least in part by an environment data file. In other examples, computing device 102 and/or 104 comprises an authored environment data store similar to authored environment data store 114. In instances where viewer application 110 is a web-based application, application 116 and/or 118 is a web browser that is used to access viewer application 110. In examples, one or more input devices and/or a hardware AR or VR device (not pictured) is attached to computing devices 102 and/or 104 and used to view and/or engage with a rendered 3D environment. For example, a VR or AR headset may be used.

Figure 2:
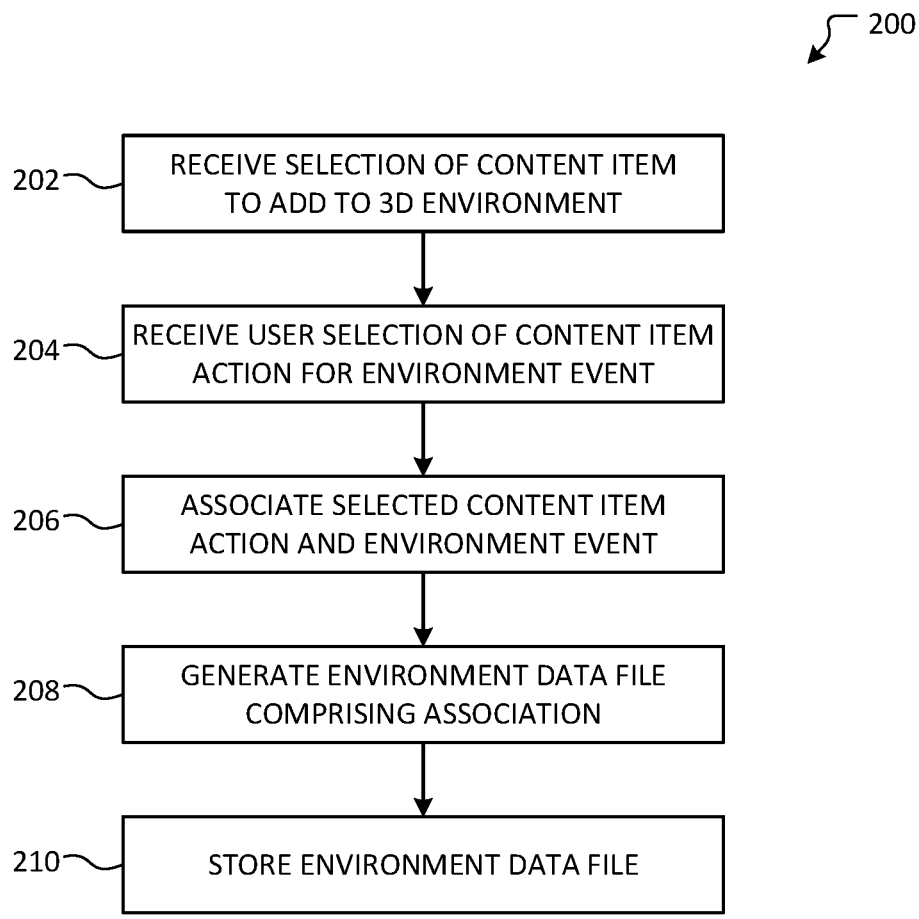
FIG. 2 illustrates an overview of an example method for authoring a three-dimensional environment implementing aspects of contextual input described herein.

FIG. 2 illustrates an overview of an example method 200 for authoring a three-dimensional environment implementing aspects of contextual input described herein. In examples, aspects of method 200 are performed by an authoring application, such as authoring application 108 in FIG. 1. The authoring application may be a web-based application and/or a native application executing on a computing device, such as computing device 102 or 104 in FIG. 1. Method 200 begins at operation 202, where a selection of a content item to add to a 3D environment is received. Example content items include, but are not limited to, 3D objects (e.g., 3D models, figures, shapes, etc.), 2D objects (e.g., files, images, presentations, documents, web sites, videos, remote resources, etc.), or audio, among other content. The selection may indicate a location in the 3D environment at which the content should be placed. While method 200 is described with respect to receiving a single selection, it will be appreciated that, in other examples, aspects of method 200 are performed multiple times to add multiple content items to the 3D environment.

At operation 204, a selection indicating a content item action for an environment event is received. As described herein, the 3D environment has a set of environment events, such that content item actions may be associated with environment events accordingly. Thus, the authoring application may display a list of environment events, thereby enabling the author to select a content item action to be associated with a displayed environment event. In examples, the user selection is received as a result of a user interacting with such a user interface, additional aspects of which are discussed with respect to FIGS. 5A-5D.

Flow progresses to operation 206, where the selected content item action is associated with the environment event. In examples, the content item action is associated with the environment event by editing a property associated with the content item to indicate that the content item "listens" for the selected environment event. The property may identify the content item action that is performed when the environment event occurs. In another example, an event table is used for the 3D environment, wherein the event table lists content item actions and associated environment events. While example techniques for associating a content item action with an environment event are described, it will be appreciated that other techniques may be used.

At operation 208, an environment data file is generated comprising the association between the content item action and the environment event. In examples, operation 208 is performed as a result of receiving a save indication or a publish indication. As described herein, the environment data file comprises information relating to content items, environment event and action associations, and assets for inclusion in the 3D environment. Similar techniques to those described above with respect to operation 206 may be used to store the association in the environment data file. For example, a property of a content item may reflect the association or an environment event table may be used, among other examples.

Moving to operation 210, the environment data file is stored. As an example, the environment data file is stored in an authored environment data store, such as authored environment data store 114 in FIG. 1. In another example, the environment data file is stored using a local storage device. In some examples, at least a part of the environment data file is stored using the local storage device, while another part of the environment data file is stored by the authored environment data store. It will be appreciated that any of a variety of techniques may be used to store the environment data store. Flow terminates at operation 210.

Figure 3:
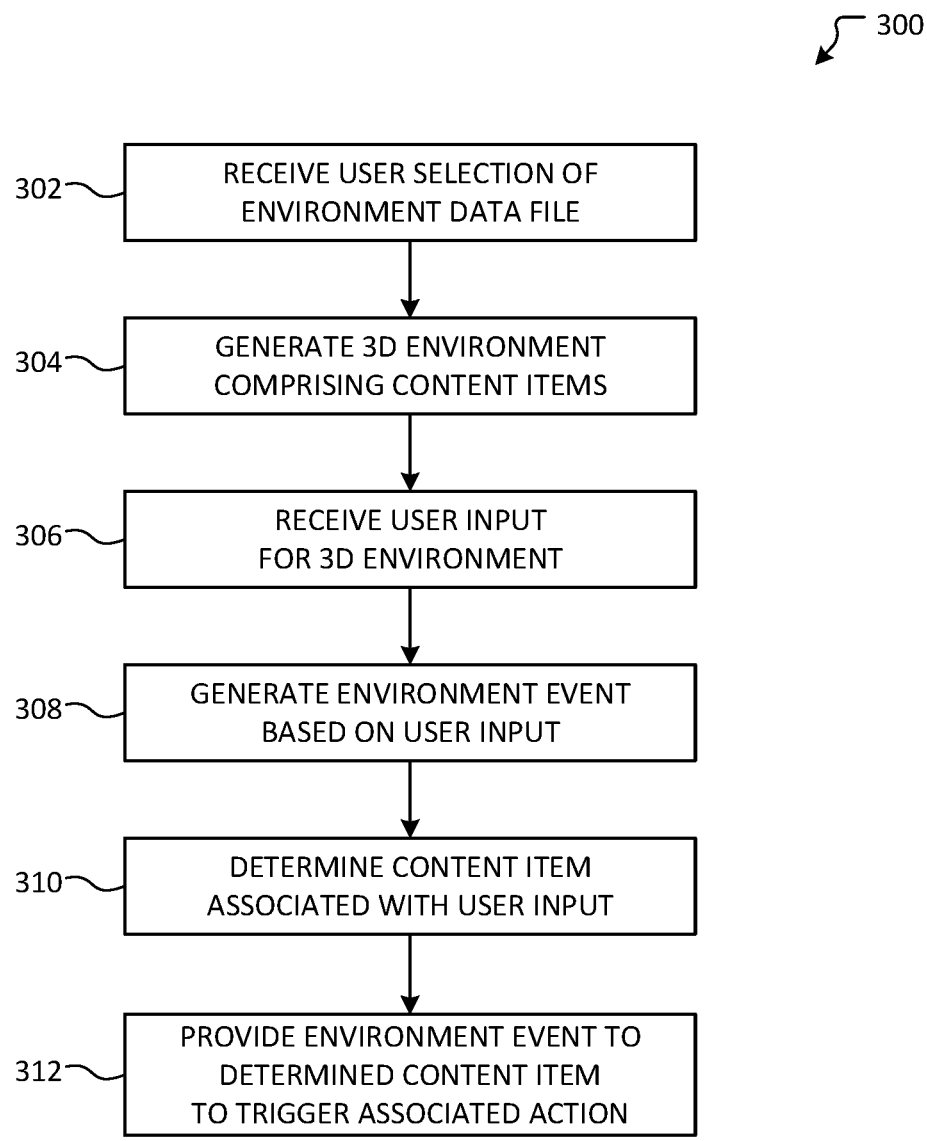
FIG. 3 illustrates an overview of an example method for the contextual processing of a user input in a three-dimensional environment.

FIG. 3 illustrates an overview of an example method 300 for the contextual processing of a user input in a three-dimensional environment. In examples, aspects of method 300 are performed by an authoring application or a viewer application, such as authoring application 108 or viewer application 110 in FIG. 1. For example, a user input processing engine may be used, such as user input processing engine 112 in FIG. 1. The authoring/viewer application may be a web-based application and/or a native application executing on a computing device, such as computing device 102 or 104 in FIG. 1.

Method 300 begins at operation 302, where a user selection of an environment data file is received. As an example, the environment data file is selected by a user browsing a webpage, wherein a link on the webpage directs a web browser to the environment data file. As another example, a user accesses the environment data file using a file browser, or selects the environment data file from a list of authored environment data files (e.g., as may be stored by an authored environment data store, such as authored environment data store 114 in FIG. 1). While example user selections are discussed herein, it will be appreciated that other user selections may be received in other examples.

At operation 304, a 3D environment is generated based on the selected environment data file. The generated 3D environment comprises one or more content items, as may be specified by the selected environment data file. In examples, the environment data file comprises references and/or data relating to the content items, as well as locations in the 3D environment at which the content items are displayed. As described above, a 3D environment comprises other assets, such as a structure and a background, among other examples. Accordingly, operation 304 may comprise accessing such assets and incorporating them into the 3D environment.

Moving to operation 306, a user input is received for the 3D environment. In examples, the user input is received from an input device of the computing device. For example the input device may be wired, wireless, or a combination thereof. Example input devices include, but are not limited to, a mouse, a keyboard, a touchscreen, a game controller, or a physical gesture recognition device, among other examples. It will be appreciated that an input device may recognize other input aside from physical movement of the user. For example, an input device may process speech input.

At operation 308, an environment event is generated based on the received user input. In examples, the environment event is generated using a user input processing engine, such as user input processing engine 112 in FIG. 1. In some examples, a mapping is used to identify an environment event associated with the received user input. In another example, a user preference is evaluated to determine an environment event that was associated with the user input by the user. While example techniques for determining an environment event from a user input are described, it will be appreciated that other techniques may be used according to aspects described herein.

Flow progresses to operation 310, where a content item associated with the user input is determined. Aspects of operation 310 may be performed using a user input processing engine, such as user input processing engine 112 in FIG. 1. In examples, determining a content item associated with the user input comprises determining whether the user input is associated with a bounding box of a content item in the 3D environment. For example, a cursor may be positioned between the bounding box of a content item and a camera associated with a view of the user into the 3D environment, such that user input associated with the cursor is determined to be associated with the content item. In another example, a user uses a VR controller to gesture in the direction of a content item, such that it is determined that the content item is the target of the input event. It will be appreciated that other detection techniques may be used according to aspects described herein. Additional example aspects are discussed below with respect to FIG. 4.

At operation 312, the determined environment event is provided to the determined content item, thereby causing the content item to perform the content item action associated with the environment event. For example, the environment event is provided to an event handler associated with the content item. In other examples, a callback function is associated with the environment event for the content item, such that the callback function is called as a result of determining that the content item is the target of the user input. The callback function may have been specified in the environment data file, as a result of performing aspects of method 200 in FIG. 2. While example techniques for providing an environment event and performing an associated content item action are described herein, it will be appreciated that other techniques may be used to trigger a content item action accordingly in other examples. Flow terminates at operation 312.

Figure 4:
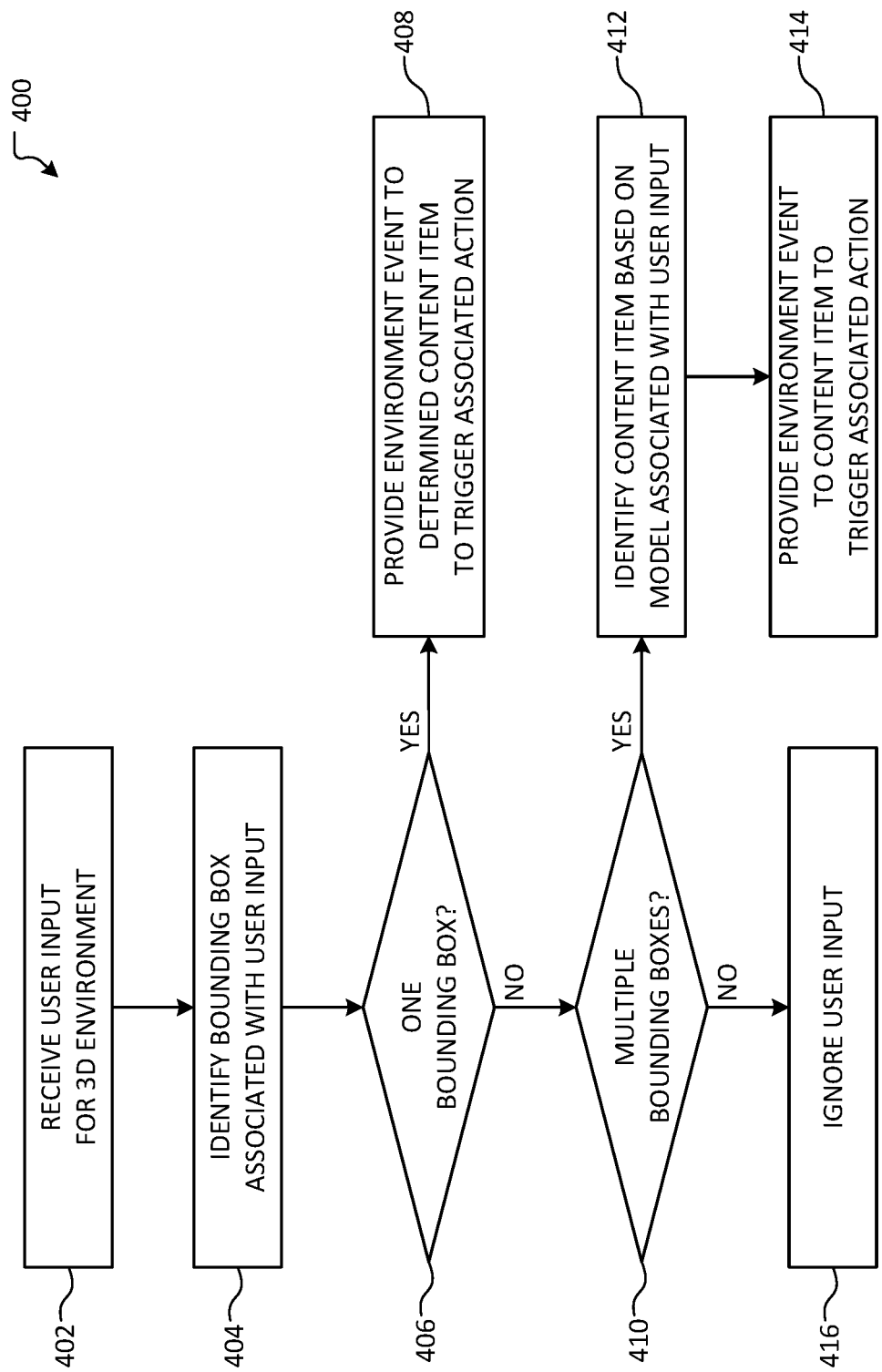
FIG. 4 illustrates an overview of an example method for determining a content item that receives an input event based on a user input.

FIG. 4 illustrates an overview of an example method 400 for determining a content item that receives an input event based on a user input. In examples, aspects of method 400 are performed by an authoring application or a viewer application, such as authoring application 108 or viewer application 110 in FIG. 1. In some examples, aspects of method 400 are performed as part of operation 310 of method 300 described above with respect to FIG. 3.

Method 400 begins at operation 402, where user input is received for a 3D environment. In examples, the user input is received from an input device of the computing device. A wide variety of input devices may be used according to aspects described herein. Flow progresses to operation 404, where a bounding box associated with the user input is identified. As used herein, a bounding box is a rectangular prism that encompasses the graphical representation of the content item in the 3D environment. It will be appreciated that other geometry may be used, such as a bounding sphere or a more complex mesh associated with a content item. In an example, a cursor is positioned between the bounding box of a content item and a camera associated with a view of the user, such that user input associated with the cursor is determined to be associated with the content item. It will be appreciated that other techniques may be used, such as hit-scan techniques or iterating through locations of available content items, among other examples.

At determination 406, it is determined whether one bounding box has been identified. In examples, multiple bounding boxes are associated with the user input, such as instances where there are overlapping content items in the 3D environment. Accordingly, if it is determined that only one bounding box has been identified, flow branches "YES" to operation 408, where the determined environment event is provided to the content item associated with the identified bounding box, thereby causing the content item to perform the content item action associated with the environment event. Flow terminates at operation 408.

However, if it is instead determined that only one bounding box has not been identified, flow instead branches "NO" to determination 410, where it is determined whether multiple bounding boxes have been identified. In examples, a user input may not be associated with any bounding boxes. Accordingly, flow branches "NO" to operation 416, where the user input is ignored. It will be appreciated that, in other examples, other actions may be taken when a user input is received that does not relate to any content items in the 3D environment. Flow terminates at operation 416.

If it is determined at determination 410, however, that multiple bounding boxes have been identified, flow instead branches "YES" to operation 412, where one content item is identified from the set of potential content items associated with the identified bounding boxes based on analyzing models associated with the user input. For example, a bounding box comprising a graphical representation of the content item at the location of the user input is selected over a bounding box comprising empty space at the location of the input event. It will be appreciated that, in other examples, other techniques may be used to identify one content item from a set of potential content items, such as bounding box size or proximity to the user input.

Flow progresses to operation 414, where the determined environment event is provided to the content item identified at operation 412, thereby causing the content item to perform the content item action associated with the environment event. Flow terminates at operation 408. Flow terminates at operation 414.

Figure 5A:
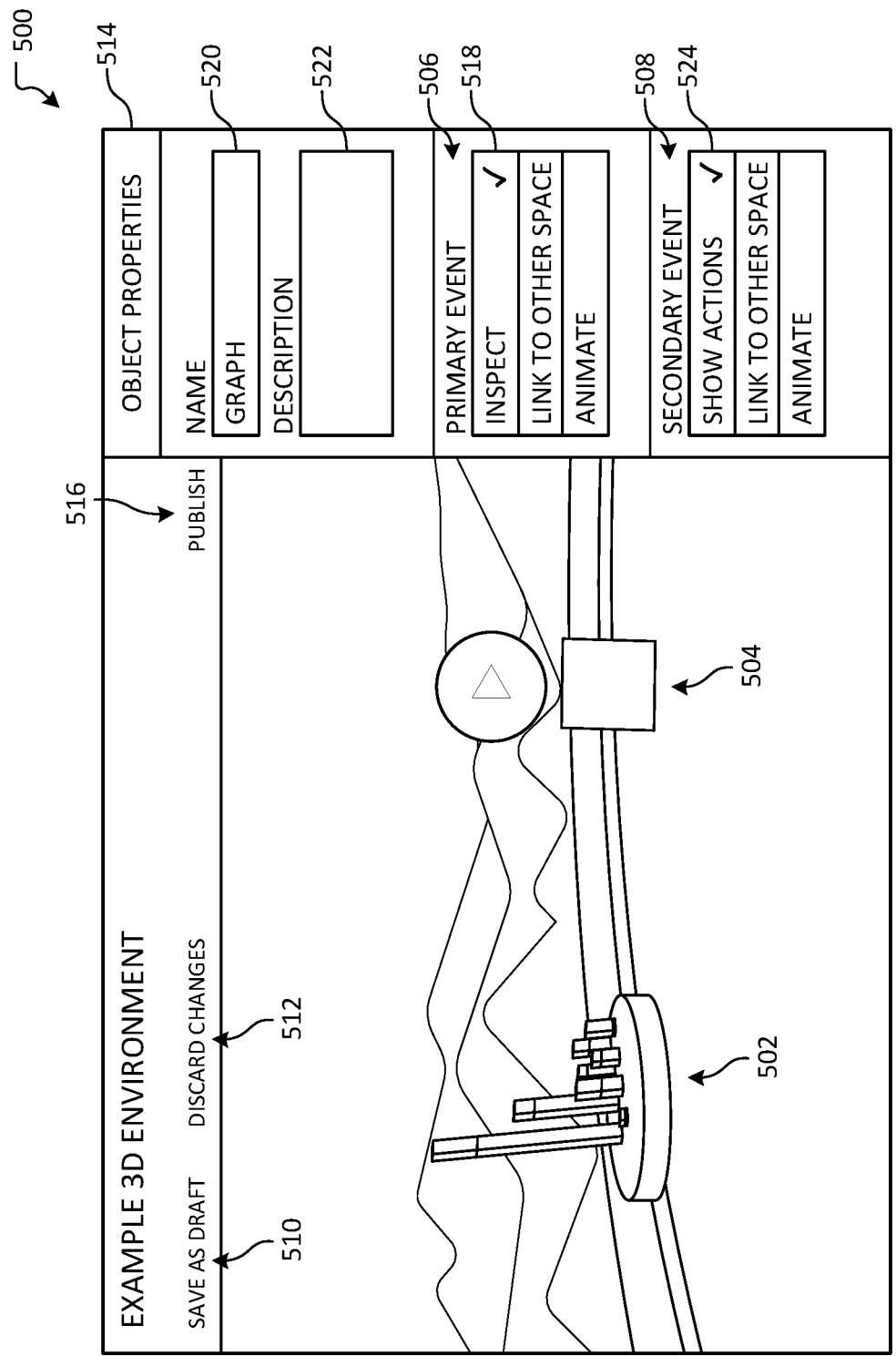
FIGS. 5A-5D illustrate example user interface aspects for contextual input in a three-dimensional environment according to aspects described herein.

FIGS. 5A-5D illustrate example user interface aspects for contextual input in a three-dimensional environment according to aspects described herein. As shown in FIG. 5A, example user interface 500 is of an authoring application, such as authoring application 108 in FIG. 1. The example 3D environment comprises content items 502 and 504. According to aspects described herein, an author may have selected content items 502 and 504 and positioned them within the 3D environment.

Example user interface 500 further comprises "save as draft" control 510, "discard changes" control 512, and "publish" control 516. In examples, save as draft control 510 generates a draft environment data file, which may be stored locally on the computing device. In another example, the draft environment data file is stored in an authored environment data store with a flag indicating it is a draft. Accordingly, the draft 3D environment may be available to one or more authors, but may not be widely available until it is published. Discard changes control 512 may be used to revert any changes to the 3D environment back to a state of the 3D environment as was last saved (e.g., using save as draft control 510 or publish control 516). Publish control 516 publishes the authored 3D environment for consumption by other users. For example, the environment data file is stored using an authored environment data store from which other users may access the environment data file and consume the environment data file using a viewer application.

Example user interface 500 further comprises object properties panel 514, which enables an author to modify various properties of a selected content item. As illustrated, object properties panel 514 is modifying content item 502. Example user interface 500 enables an author to specify a name 520 of the content item, as well as a description 522. Object properties panel 514 further comprises primary event selector 506 and secondary event selector 508. According to aspects described herein, primary event selector 506 and secondary event selector 508 are used to associate content item actions with environment events.

Primary event selector 506 is illustrated as comprising dropdown 518. The "Inspect" content item action is illustrated with a checkmark, thereby indicating that the primary environment event is associated with the "Inspect" content item action. As a result, if a primary environment event is received by content item 502, the "Inspect" action is performed. Secondary event selector 508 is similarly illustrated as comprising dropdown 524, wherein the "Show Actions" action is illustrated with a checkmark to indicate that the secondary environment event is associated with the "Show Actions" content item action. Thus, if a secondary environment event is received by content item 502, the "Show Actions" action is performed. While example user interface elements and techniques are described herein, it will be appreciated that other examples may be used to enable a user to associate environment events with content item actions.

Figure 5B:
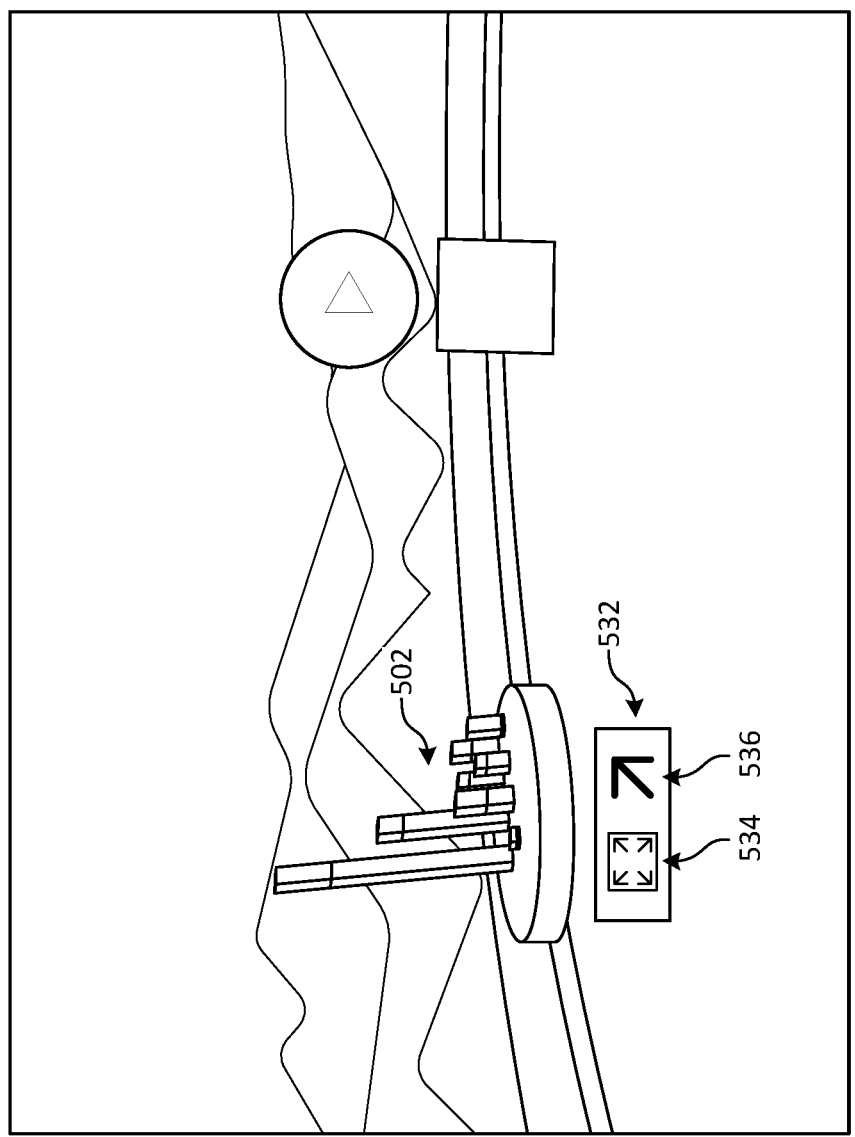

Turning to FIG. 5B, example view 530 illustrates content item 502 performing the content item action associated with a secondary environment event. Example views 530-550 may be of an authoring application or a viewer application, such as authoring application 108 or viewer application 110 in FIG. 1. As discussed above, the associated content item action is "Show Actions." Thus, action display 532 is presented as a result of a secondary environment event generated in response to a received user input from an input device. Action display 532 is illustrated as comprising "inspect" action 534 and "link to other environment" action 536. In examples, an inspect action causes content item 502 to appear larger in the view of the user, as is discussed in greater detail with respect to FIG. 5C. The link to other environment action may cause a different 3D environment to be loaded and displayed to the user. While example actions are described, it will be appreciated that any of a variety of other content item actions may be provided.

Figure 5C:
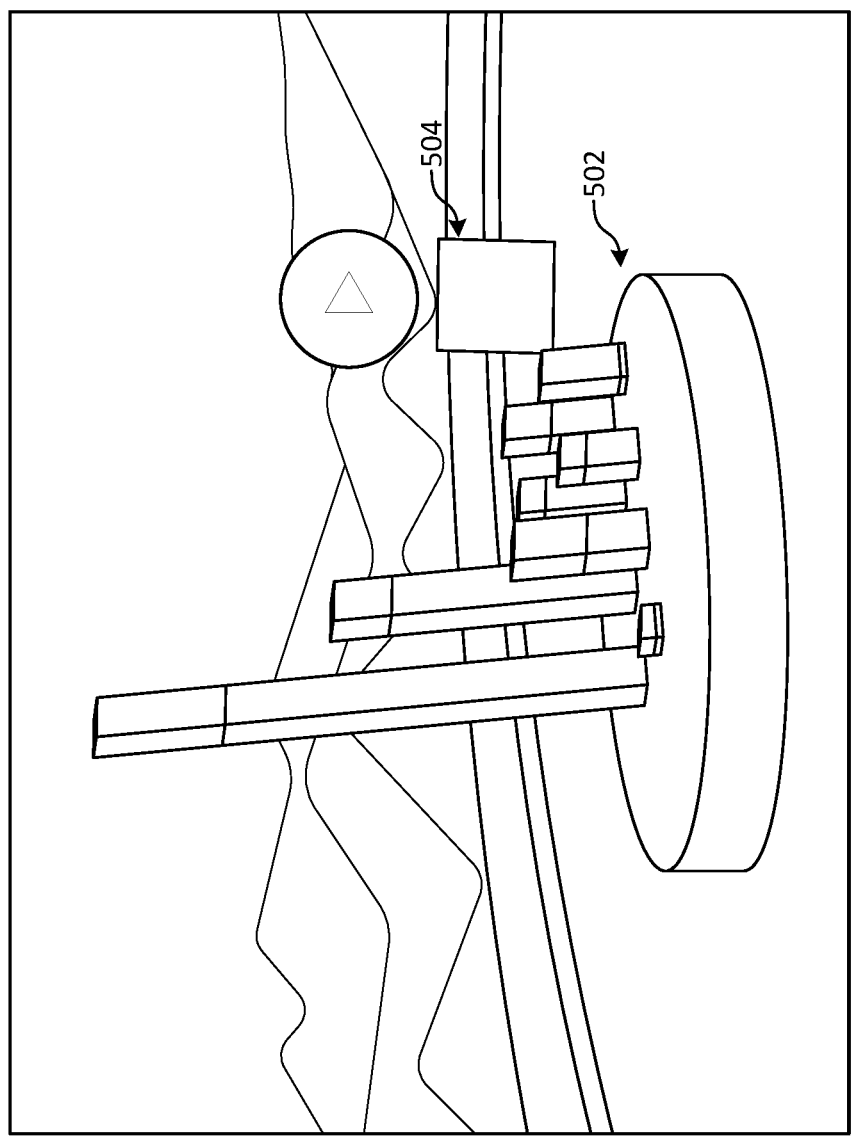

Example view 540 in FIG. 5C is provided to illustrate the "inspect" action, wherein a content item is scaled to increase its size as perceived by the user. As illustrated, content item 502 appears larger in the user's view, while content item 504 is in the background. In examples, the background may be dimmed such that content item 502 is further emphasized. It will be appreciated that other visual effects may be used. As discussed above in FIG. 5B, the inspect action is performed as a result of a user actuating "inspect" action 534 in action display 532. In another example, the inspect action is performed as a result of a primary environment event being triggered based on a received user input from an input device. FIG. 5A illustrated the association between the primary environment event and the inspect action in primary event selector 506.

Figure 5D:
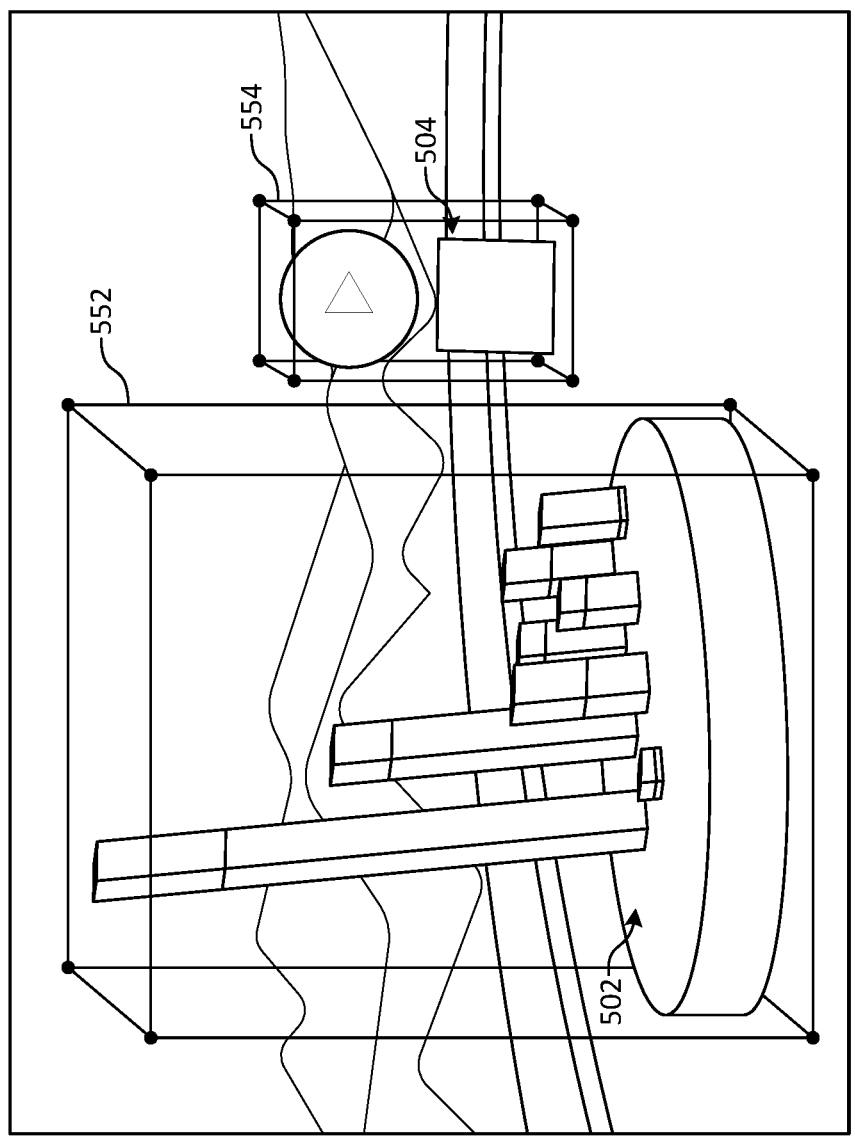

Example view 550 of FIG. 5D illustrates bounding boxes 552 and 554 of content items 502 and 504, respectively. It will be appreciated that, in examples, bounding boxes 552 and 554 are not graphically displayed within a 3D environment but are displayed in environment 550 for illustrative purposes. Similar to aspects discussed with respect to methods 300 and 400 in FIGS. 3 and 4, respectively, bounding boxes 552 and 554 are evaluated in order to determine a content item to which an environment event is provided. In examples where bounding boxes 552 and 554 overlap (as may be the case if the view of the user is shifted to the left), other aspects of content items 502 and 504 may be evaluated to determine which content item receives the event. For example, one or more models of content items 502 and 504 are evaluated or the proximity of the content item to a camera associated with the user's view is evaluated, among other examples. It will be appreciated that bounding boxes 552 and 554 are provided as examples and that, in other examples, other geometry may be used, such as a bounding sphere or a more complex mesh associated with a content item.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
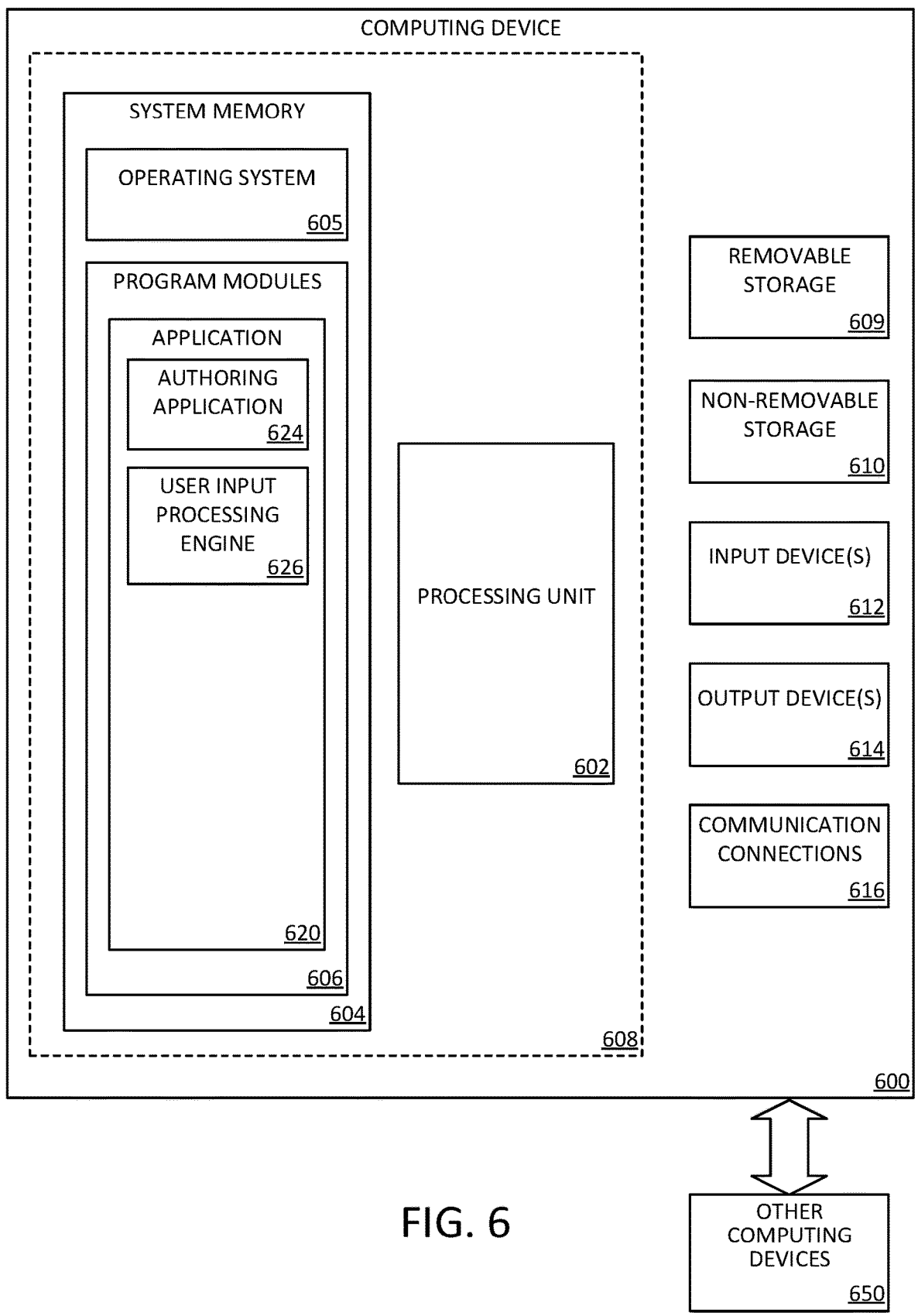
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including the computing devices 102 and 104 and the 3D environment service 106. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store authoring application 624 and user input processing engine 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a transitory carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
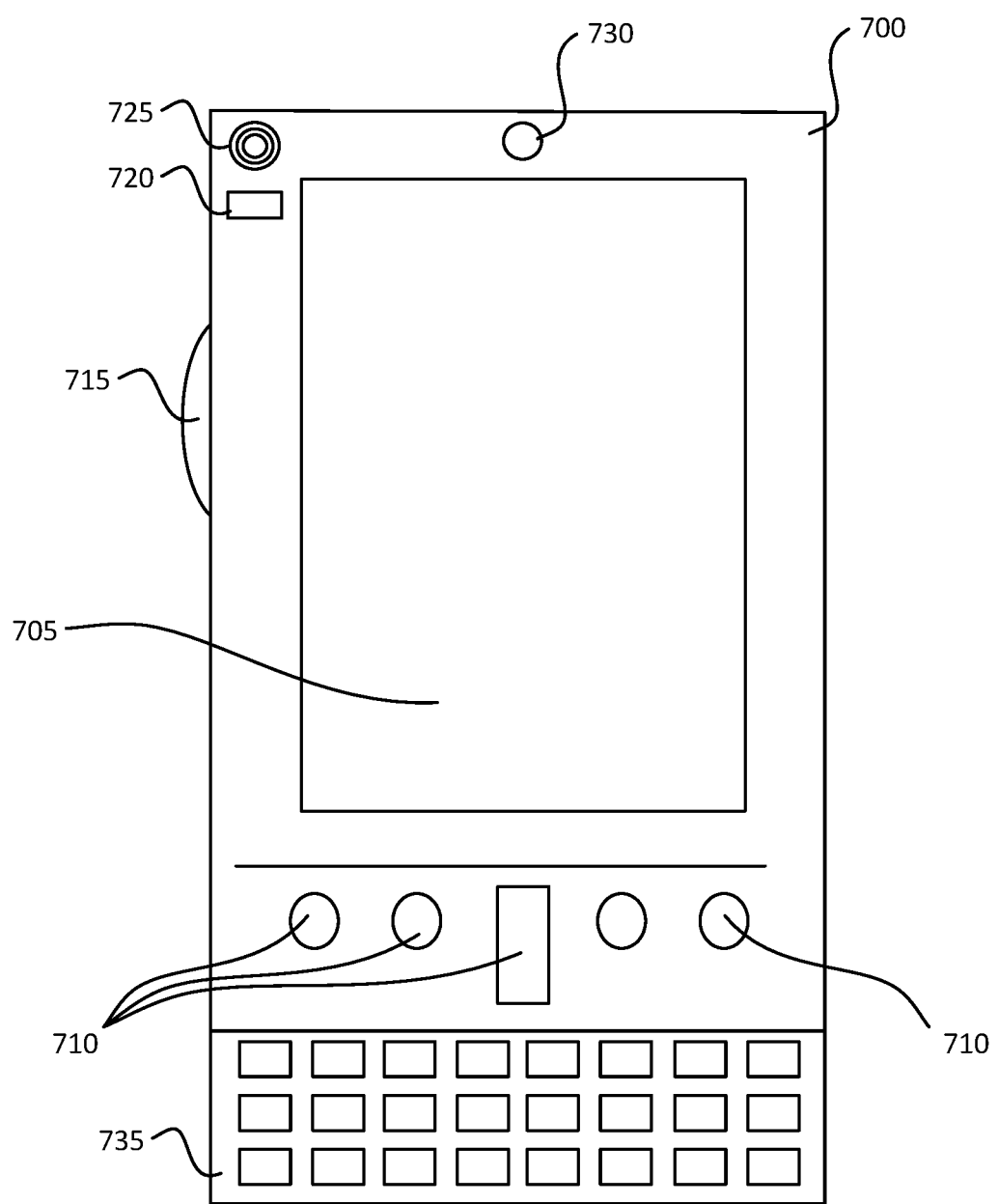
FIGS. 7A and 7B are simplified block diagrams of a mobile computing device with which aspects of the present disclosure may be practiced.
Figure 7B:
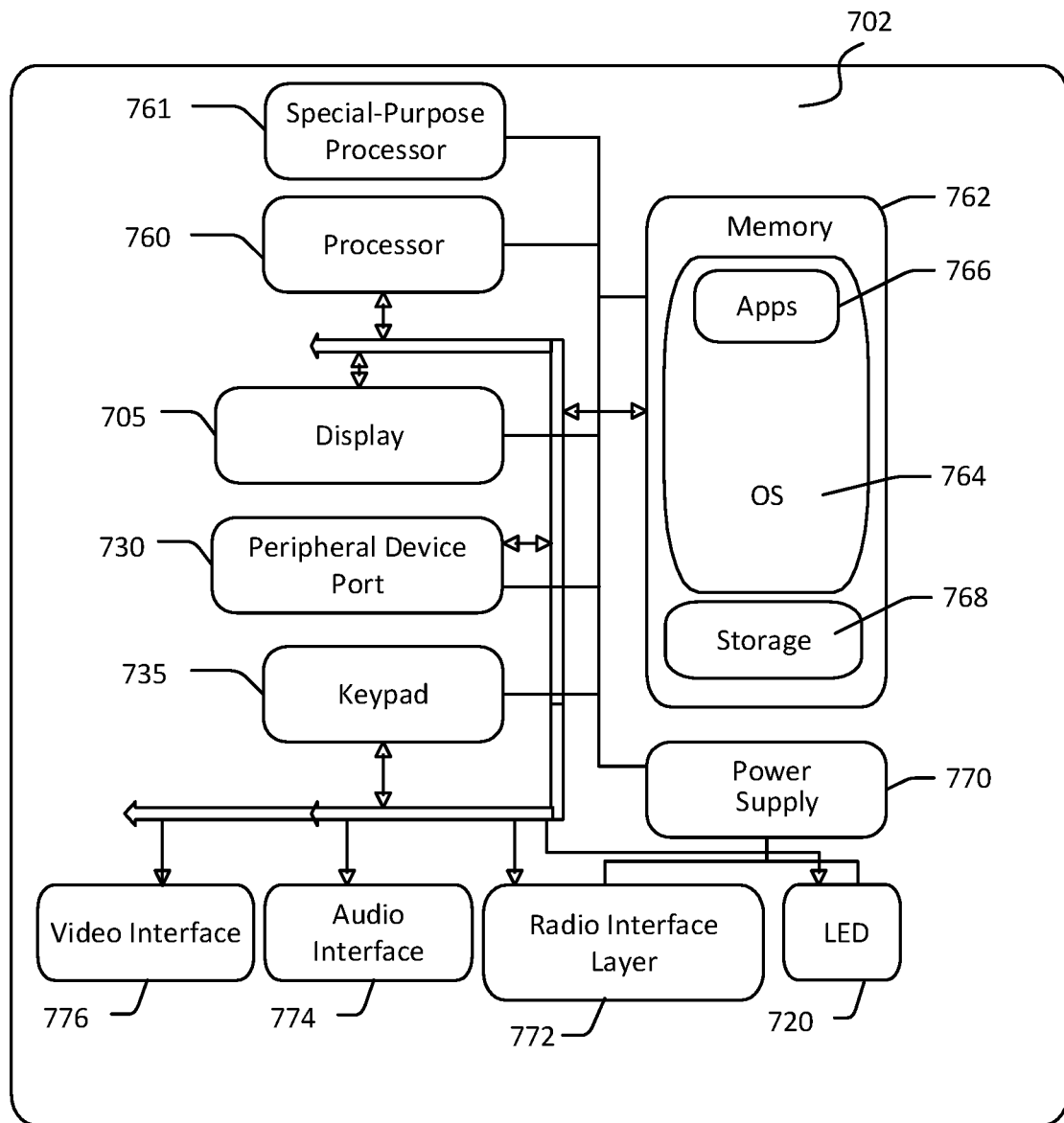

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a web browser, an authoring application, a viewer application, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
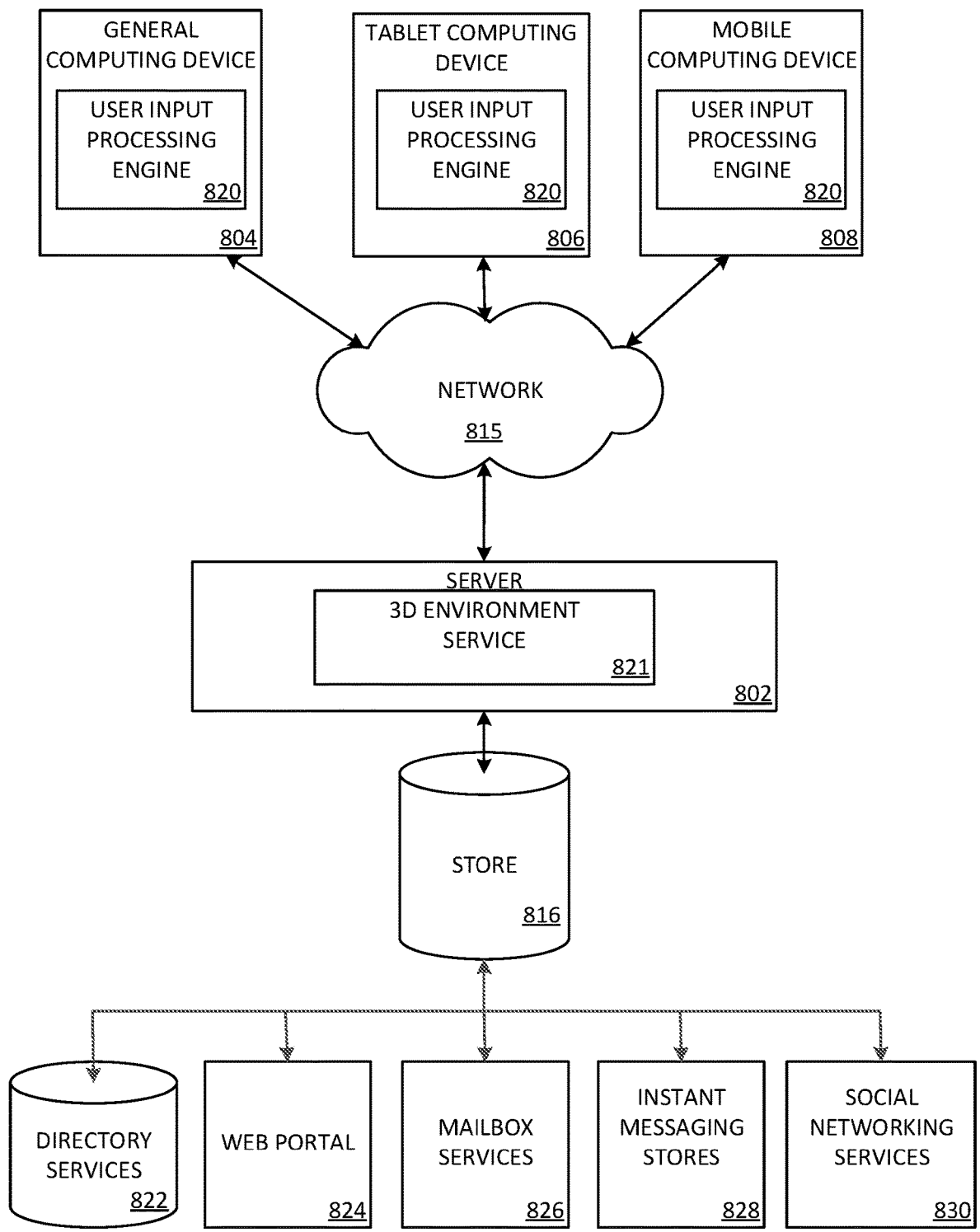
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A user input processing engine 820 may be employed by a client that communicates with server device 802, and/or the 3D environment service 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
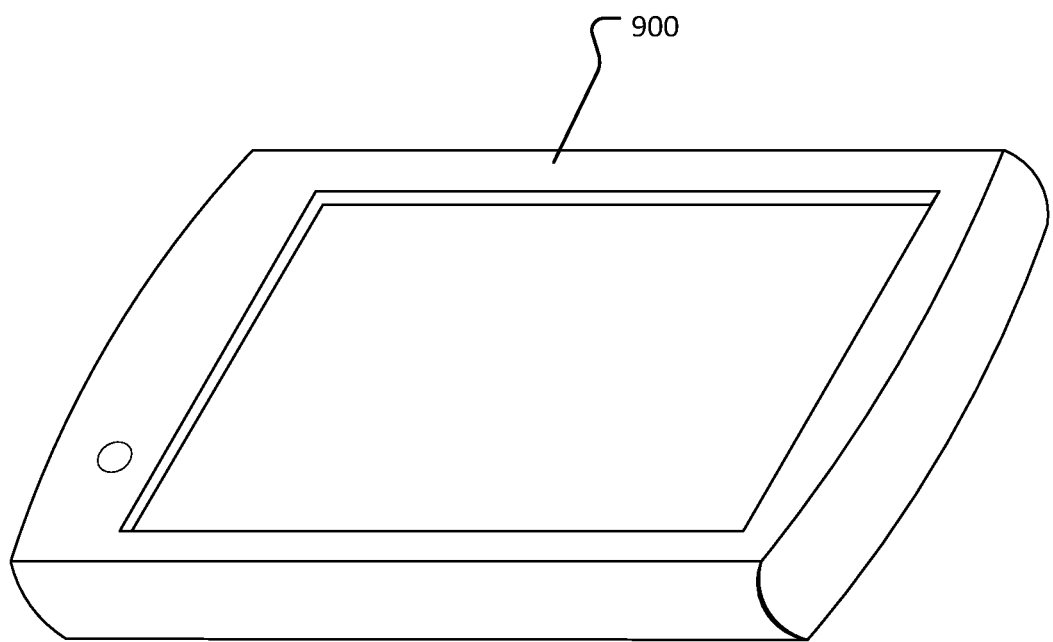
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: generating a three-dimensional (3D) environment comprising a first content item, wherein the first content item is associated with a first content item action; receiving a first user input event from a first input device; generating an environment event from a set of environment events for the 3D environment, wherein the environment event is associated with the first user input event from the first input device; determining the first user input event is for the first content item; and based on determining that the first user input event is for the first content item, causing, using an association between the environment event and the first content item action, the first content item action to be performed by the first content item. In an example, determining the first user input event is for the first content item comprises evaluating the first user input event based on a bounding box associated with the first content item. In another example, the set of operations further comprises: receiving, from a second input device, a second user input event, wherein the second user input event is different from the first user input event; and generating the environment event based on an association between the environment event the first user input event. In a further example, the 3D environment further comprises a second content item associated with a second content item action, and the set of operations further comprises: receiving an indication from the first content item; based on the received indication: generating another environment event; and providing the another environment event to the second content item, thereby causing the second content item action to be performed. In yet another example, determining the first user input event is for the first content item comprises: identifying a first bounding box associated with the first content item and a second bounding box associated with a second content item as both being associated with the first user input event; and determining, based on evaluating a first model associated with the first content item and a second model associated with the second content item, that the first user input event is for the first content item. In a further still example, determining the first user input event is for the first content item comprises: identifying a first bounding box associated with the first content item and a second bounding box associated with a second content item as both being associated with the first user input event; and determining, based on the first content item being closer to a camera associated with a user's view than the second content item, that the first user input event is for the first content item. In another example, the 3D environment is generated from an environment data file comprising: the first content item; and an association of the first content item action with the environment event.

In another aspect, the technology relates to a method for contextual input in a three-dimensional (3D) environment. The method comprises: generating a 3D environment comprising: a first content item associated with a first content item action; and a second content item associated with a second content item action; receiving a first user input event from a first input device; generating an environment event from a set of environment events for the 3D environment, wherein the environment event is associated with the first user input event from the first input device; determining whether the first user input event is for the first content item or the second content item; when it is determined that the first user input event is for the first content item, providing the generated environment event to the first content item, thereby causing the first content item action to be performed; and when it is determined that the first user input event is for the second content item, providing the generated environment event to the second content item, thereby causing the second content item action to be performed. In an example, determining whether the first user input event is for the first content item or the second content item comprises evaluating the first user input event based on: a first bounding box associated with the first content item; and a second bounding box associated with the second content item. In another example, the method further comprises: receiving, from a second input device, a second user input event, wherein the second user input event is different from the first user input event; and generating the environment event based on an association between the environment event the first user input event. In a further example, the method further comprises: receiving an indication from the first content item; based on the received indication: generating another environment event; and providing the another environment event to the second content item, thereby causing the second content item action to be performed. In yet another example, determining whether the first user input event is for the first content item or the second content item comprises: identifying a first bounding box associated with the first content item and a second bounding box associated with a second content item as both being associated with the first user input event; and determining, based on the first content item being closer to a camera associated with a user's view than the second content item, that the first user input event is for the first content item. In a further still example, the 3D environment is generated from an environment data file comprising: the first content item; and an association of the first content item action with the environment event.

In another aspect, the technology relates to another method for or contextual input in a three-dimensional (3D) environment. The method comprises: generating a 3D environment comprising a first content item, wherein the first content item is associated with a first content item action; receiving a first user input event from an input device; generating an environment event from a set of environment events for the 3D environment, wherein the environment event is associated with the first user input event from the first input device; determining the first user input event is for the first content item; and based on determining that the first user input event is for the first content item, causing, using an association between the environment event and the first content item action, the first content item action to be performed by the first content item. In an example, determining the first user input event is for the first content item comprises evaluating the first user input event based on a bounding box associated with the first content item. In another example, the method further comprises: receiving, from a second input device, a second user input event, wherein the second user input event is different from the first user input event; and generating the environment event based on an association between the environment event the first user input event. In a further example, the 3D environment further comprises a second content item associated with a second content item action, and the method further comprises: receiving an indication from the first content item; based on the received indication: generating another environment event; and providing the another environment event to the second content item, thereby causing the second content item action to be performed. In yet another example, determining the first user input event is for the first content item comprises: identifying a first bounding box associated with the first content item and a second bounding box associated with a second content item as both being associated with the first user input event; and determining, based on evaluating a first model associated with the first content item and a second model associated with the second content item, that the first user input event is for the first content item. In a further still example, determining the first user input event is for the first content item comprises: identifying a first bounding box associated with the first content item and a second bounding box associated with a second content item as both being associated with the first user input event; and determining, based on the first content item being closer to a camera associated with a user's view than the second content item, that the first user input event is for the first content item. In another example, the 3D environment is generated from an environment data file comprising: the first content item; and an association of the first content item action with the environment event.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      storing first data defining an association between an environment event and a first user input event from a first input device, the first data defined using an authoring application;
      storing second data defining an association between the environment event and a first content item action associated with a content item in a three-dimensional (3D) environment, the second data defined using the authoring application;
      generating the 3D environment comprising the first content item;
      receiving the first user input event from the first input device; and
      responsive to receiving the first user input event,
         causing, using the first data, the environment event associated with the first user input event to be generated;
         determining the first user input event is for the first content item, and
         based on determining that the first user input event is for the first content item, causing, using the second data, the first content item action to be performed by the first content item.

2. The system of claim 1, wherein determining the first user input event is for the first content item comprises evaluating the first user input event based on a bounding box associated with the first content item.

3. The system of claim 1, wherein the set of operations further comprises:
   receiving, from a second input device, a second user input event, wherein the second user input event is different from the first user input event; and
   generating the environment event based on an association between the environment event and the second user input event.

4. The system of claim 1, wherein the 3D environment further comprises a second content item associated with a second content item action, and wherein the set of operations further comprises:
   receiving an indication from the first content item;
   based on the received indication:
      generating another environment event; and
      providing the another environment event to the second content item, thereby causing the second content item action to be performed.

5. The system of claim 4, wherein determining the first user input event is for the first content item comprises:
   identifying a first bounding box associated with the first content item and a second bounding box associated with a second content item as both being associated with the first user input event; and
   determining, based on evaluating a first model associated with the first content item and a second model associated with the second content item, that the first user input event is for the first content item.

6. The system of claim 4, wherein determining the first user input event is for the first content item comprises:
   identifying a first bounding box associated with the first content item and a second bounding box associated with a second content item as both being associated with the first user input event; and
   determining, based on the first content item being closer to a camera associated with a user's view than the second content item, that the first user input event is for the first content item.

7. The system of claim 1, wherein the 3D environment is generated from an environment data file comprising:
   data defining the first content item;
   the first data; and
   the second data.

8. A computer-implemented method for contextual input in a three-dimensional (3D) environment, comprising:
   storing first data defining an association between an environment event and a first user input event from a first input device, the first data defined using an authoring application;
   storing second data defining an association between the environment event and a first content item action associated with a content item in a three-dimensional (3D) environment, the second data defined using the authoring application;
   generating the 3D environment comprising: comprising the first content item;
   receiving the first user input event from the first input device; and
   responsive to receiving the first user input event,
      causing, using the first data, the environment event associated with the first user input event from the first input device; to be generated,
      determining the first user input event is for the first content item, and
      based on determining that the first user input event is for the first content item, causing, using the second data, the first content item action to be performed by the first content item.

9. The method of claim 8, wherein determining the first user input event is for the first content item comprises evaluating the first user input event based on:
   a first bounding box associated with the first content item; and
   a second bounding box associated with a second content item.

10. The method of claim 8, further comprising:
    receiving, from a second input device, a second user input event, wherein the second user input event is different from the first user input event; and
    generating the environment event based on an association between the environment event and the second user input event.

11. The method of claim 8, further comprising:
    receiving an indication from the first content item;
    based on the received indication:

generating another environment event; and
providing the another environment event to a second content item, thereby causing a second content item action to be performed.

12. The method of claim 8, wherein determining the first user input event is for the first content item comprises:
identifying a first bounding box associated with the first content item and a second bounding box associated with a second content item as both being associated with the first user input event; and
determining, based on the first content item being closer to a camera associated with a user's view than the second content item, that the first user input event is for the first content item.

13. A computer storage media having instructions stored thereupon which, when executed by a computer, cause the computer to perform operations comprising:
storing first data defining an association between an environment event and a first user input event from a first input device, the first data defined using an authoring application;
storing second data defining an association between the environment event and a first content item action associated with a content item in a three-dimensional (3D) environment, the second data defined using the authoring application;
generating the 3D environment comprising the first content item;
receiving the first user input event from the first input device; and
responsive to receiving the first user input event,
generating, using the first data, the environment event associated with the first user input event;
determining the first user input event is for the first content item, and
based on determining that the first user input event is for the first content item, causing, using the second data, the first content item action to be performed by the first content item.

14. The computer storage media of claim 13, having further instructions stored thereupon to perform operations comprising:
receiving, from a second input device, a second user input event, wherein the second user input event is different from the first user input event; and
generating the environment event based on an association between the environment event and the second user input event.

15. The computer storage media of claim 14, wherein the 3D environment further comprises a second content item associated with a second content item action, and wherein the computer storage media has further instructions stored thereupon to perform operations comprising:
receiving an indication from the first content item;
based on the received indication:
generating another environment event; and
providing the another environment event to the second content item, thereby causing the second content item action to be performed.

16. The computer storage media of claim 15, wherein determining the first user input event is for the first content item comprises:
identifying a first bounding box associated with the first content item and a second bounding box associated with the second content item as both being associated with the first user input event; and
determining, based on evaluating a first model associated with the first content item and a second model associated with the second content item, that the first user input event is for the first content item.

17. The computer storage media of claim 15, wherein determining the first user input event is for the first content item comprises:
identifying a first bounding box associated with the first content item and a second bounding box associated with the second content item as both being associated with the first user input event; and
determining, based on the first content item being closer to a camera associated with a user's view than the second content item, that the first user input event is for the first content item.

\* \* \* \* \*